Nov. 1, 1927. 1,647,283
A. ESAU
ARRANGEMENT FOR IMPROVING SHORT WAVE RADIATION INTO SPACE
Filed Oct. 8, 1926
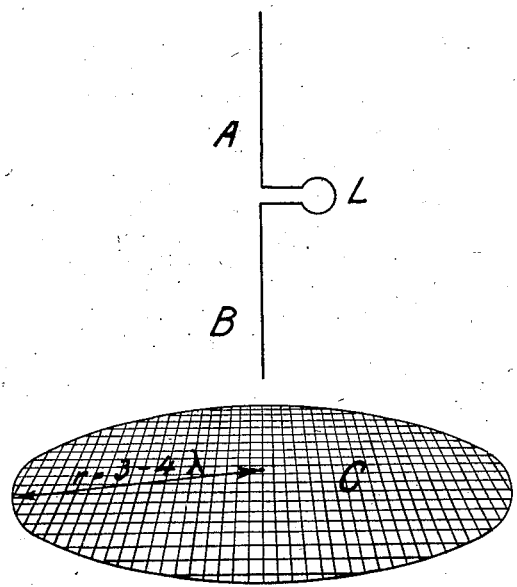
Inventor:
A. Esau Patented Nov. 1, 1927.

1,647,283

UNITED STATES PATENT OFFICE.

ABRAHAM ESAU, OF JENA, GERMANY.

ARRANGEMENT FOR IMPROVING SHORT-WAVE RADIATION INTO SPACE.

Application filed October 8, 1926, Serial No. 140,379, and in Germany October 7, 1925.

This invention relates in general to arrangements for improving the radiation of electricity into space and more particularly for radiation for short-wave apparatus.

In accordance with my invention the radiation of the antenna—or dipole as it is often called in short-wave science—is elevated to the greatest possible extent by artificially improving the conductivity of the earth's surface. Beneath the dipole a layer of high conductivity is provided that is not connected with the dipole. This layer is produced by covering the surface of the earth with a closed homogeneous member or with a known form of earthing member in the shape of a wire star, wire network, metallic gauze, metal chips or filings or the like. The conductivity of the earth surface may also be improved to the desired extent by treating or saturating it with an agency which is itself a conductor or which becomes a conductor by its chemical combination with the earth.

Experiments carried out in connection with the short wave transmitting systems with artificial layers of high conductivity of this kind have proved that the best results are obtained with a surface whose radius is about three to four times the length of the waves radiated. The conditions then obtaining may be set forth as follows: It is well known that the main losses in wireless sending stations in the vicinity of the sender are due to earth currents. It is thus of the greatest importance to diminish such losses by technical means as far as possible. For this purpose there are already known arrangements for stations employing longer waves for improving the electric conductivity of the surface of the ground, such as, for instance, the use of buried conductor wires or stretched-out counterpoises, or radiating conductors of "star" or "claw" type and which are so adjusted that in all directions the same current flows.

These losses in the neighborhood of the sender are especially noticeable in the case of short wave senders. The area of the ground arrangement in this latter instance can, obviously, be smaller than in the case of long wave senders, owing to the obtaining higher frequency. If for instance very short waves are used, down to a few meters, then the ground screen or conductor may be of comparatively small size. I have discovered, however, that for short wave transmission a great increase of efficiency is obtained if the radius of the artificial surface of high conductivity is of a certain length with respect to the length of the waves radiated, i. e., substantially from three to four times the length of the waves radiated.

The advantages are reduction of losses due to dispersion and earth absorption, and the leading of the electric energy into space under very favorable conditions, since the energy may be radiated at an angle upwardly so as to strike the heavyside layer for reflection to the receiving station, in which case great distances may be reached and a directional action obtained, with increased freedom from electrical disturbances and increased selectivity. By this means there is avoided transmission of the short waves parallel with the ground surfaces which under such method of transmission often results in the waves being absorbed by the ground and disappearing entirely.

In contemplating arrangements in which on the antenna there are superimposed several wave lengths, or in other words, if the antenna is excited in one of its harmonics, for the purpose of obtaining an upwardly directed radiation, then theoretically the earth would have to have an excessively high conductivity, if such rays should not be broken up into a series of components, which are radiated also parallel to the earth's surface, for only in this instance can it be accepted, that there is a reflection (reflected image) of the true antenna as regards the conducting surface, and by mathematical calculation the field distribution and the radiation of energy into space at an angle of elevation can be proved.

All requirements for this purpose are obtained, as very exact research has proved, if the improvement in the conductivity in the neighborhood of the antenna in a circumference of a few wave length radii, practically of the extent of about 3 to 4, are made to approach as near as possible to the theoretical case of infinite conductivity, as in the present case.

The invention is illustrated in the drawing in which A and B are two sections of an antenna or dipole, which may consist of wires or groups of wires, are interconnected through a loop L by which the dipole is coupled to the sender. C represents the layer of high conductivity spread on the earth beneath the dipole. This layer, which is represented as a piece of wire netting, has a radius $r$ that is about three to four times the length of the waves radiated from the dipole A, B.

I claim:

1. Arrangement for improving the radiation of electricity into space, comprising a radiating conductor, and an artificial surface of high conductivity beneath said conductor whose radius is about three to four times the length of the waves radiated.

2. Arrangement for improving the radiation of electricity into space, comprising a radiating conductor, and a metallic member beneath the radiating conductor whose radius is about three to four times the length of the waves radiated.

3. Arrangement for improving the radiation of electricity into space, comprising a radiating conductor, and a surface of the earth beneath said conductor treated so as to raise its conductivity, the radius of said surface being about three to four times the length of the waves radiated.

4. Arrangement for improving the radiation of short electric waves into space, comprising an insulated dipole radiator, and an artificial surface of high conductivity beneath said radiator whose radius is about three to four times the length of the waves radiated.

5. Arrangement for improving the radiation of short electric waves into space, comprising an insulated dipole radiator, and a metallic member beneath the radiator whose radius is about three to four times the length of the waves radiated.

6. Arrangement for improving the radiation of short electric waves into space, comprising an insulated dipole radiator, and a surface of the earth beneath said radiator treated so as to raise its conductivity, the radius of said surface being about three to four times the length of the waves radiated.

7. Arrangement for improving the radiation of short electric waves into space, comprising a dipole radiator, and an artificial surface of high conductivity coaxially arranged beneath and spatially related to the radiator, the radius of which surface is substantially three to four times the length of the waves radiated by the radiator.

In testimony whereof I have affixed my signature.

ABRAHAM ESAU.